US011066252B2

(12) United States Patent
Fortini et al.

(10) Patent No.: US 11,066,252 B2
(45) Date of Patent: Jul. 20, 2021

(54) SUCTION GRIPPING DEVICE

(71) Applicant: GIMA S.p.A, Zola Predosa (IT)

(72) Inventors: Gianluca Fortini, Zola Predosa (IT); Massimo Pacifici, Zola Predosa (IT)

(73) Assignee: I.M.A. INDUSTRIA MACCHINE AUTOMATICHE S.P.A, Ozzano dell'Emilia (IT)

( * ) Notice: Subject to any disclaimer, the term of this patent is extended or adjusted under 35 U.S.C. 154(b) by 205 days.

(21) Appl. No.: 16/461,099

(22) PCT Filed: Nov. 15, 2017

(86) PCT No.: PCT/IB2017/057132
§ 371 (c)(1),
(2) Date: May 15, 2019

(87) PCT Pub. No.: WO2018/096423
PCT Pub. Date: May 31, 2018

(65) Prior Publication Data
US 2020/0039764 A1    Feb. 6, 2020

(30) Foreign Application Priority Data
Nov. 22, 2016  (IT) .................. 102016000117872

(51) Int. Cl.
*B65G 47/91*   (2006.01)
*B25J 15/06*   (2006.01)
(Continued)

(52) U.S. Cl.
CPC .......... *B65G 47/912* (2013.01); *B25B 11/005* (2013.01); *B25J 5/02* (2013.01); *B25J 15/0616* (2013.01)

(58) Field of Classification Search
CPC .. B25J 15/0616; B25J 15/0625; B25J 15/065; B25J 5/02; B65G 47/912; B25B 11/005
(Continued)

(56) References Cited

U.S. PATENT DOCUMENTS 4,173,176 A     11/1979  Svensson
6,397,886 B1 *  6/2002   Schopferer ............. F16L 55/26
                                                   137/580

(Continued)

FOREIGN PATENT DOCUMENTS

EP   0169652 A1   1/1986
FR   2194810 A1   3/1974
(Continued)

*Primary Examiner* — Dean J Kramer
(74) *Attorney, Agent, or Firm* — R. Neil Sudol; Henry D. Coleman

(57) ABSTRACT

A suction gripping device includes a support arm and a head with at least one suction gripping element mounted translatably along the support arm. The head has an inlet and a channelling system to place the inlet and the gripping element in communication. The device further includes a manifold maintained in depression, a seal along a side of the device to maintain the inside of the manifold in depression, and a fluid distributor group interposed between the inlet in the head and the side and borne by the head so as to be slidable along the side. A spacer is provided for distancing and keeping a portion of the seal distanced from the side so as to maintain the channelling system in depression for activation in suction of the gripping element.

8 Claims, 10 Drawing Sheets

(51) Int. Cl.
B25B 11/00 (2006.01)
B25J 5/02 (2006.01)

(58) Field of Classification Search
USPC ...................................................... 414/752.1
See application file for complete search history.

(56) References Cited

U.S. PATENT DOCUMENTS

| | | | |
|---|---|---|---|
| 9,126,764 B1 * | 9/2015 | Taggart | ................. B65G 41/02 |
| 2004/0041321 A1 | 3/2004 | Hsieh | |

FOREIGN PATENT DOCUMENTS

| JP | S54 72809 A | 6/1979 |
|---|---|---|
| JP | 2009/090410 A | 4/2009 |

* cited by examiner

SUCTION GRIPPING DEVICE

The present invention relates to the particular technical sector concerning apparatus and devices for carrying out an automatic gripping action by suction of an object from a picking-up position and for transfer thereof to a release position.

Suction gripping devices are commonly used for picking up objects which are to be handled with great care, or when a high sanitary level is required.

For example, suction gripping devices are usually employed in injection moulding plants of components made of a plastic material for picking up components from an injection moulding press and transferring them to other work and/or packing stations.

A suction gripping device of known type for carrying out a picking-up by suction of an object from a picking-up position, and for transferring the object to a release position comprises: a support arm, a head provided with at least a suction gripping element which is mounted on the support arm in such a way as to be translated by guides along the arm.

The head also comprises an inlet for passage of fluid, communicating with the outside, and, internally thereof, a channelling system for passage of fluid which is predisposed and configured so as to be in communication with both the inlet and the at least a suction gripping element.

The known gripping device has an aspirating system which comprises a suction source and flexible tubes or cables for connecting the suction source at the inlet present in the head, so that when the suction source is activated a depression can be created, i.e. a suction effect (vacuum) in the channelling system, and therefore a depression in the gripping element so as to enable gripping of an object by suction.

The operation of the gripping device is as follows.

When the gripping device is to pick up an object, the head is translated on the guides along the support arm up to positioning the gripping element in the position in which the object is located, then the suction source is activated so as to create a depression in the channelling system present between the heads, and therefore create a suction effect in the gripping element, which thus picks up the object by suction.

Once the object has been picked up, the head is newly translated on the guides, in an opposite direction to the previous direction, so as to bring the gripping element with the object into the correct position for release thereof or gripping thereof by special handling organs.

The use of the gripping device has various drawbacks.

The presence of the tubes and cables that connect the suction source to the inlet present in the head leads to a series of drawbacks, in terms of both volumes and efficiency.

In fact, the tubes and cables must have a length that is such as to enable them to follow the translation of the head along the support arm, which can require displacements even by a few metres, and therefore they extend or fold on themselves according to the position of the head on the support arm.

This leads to various issues, in terms of both inertia, in consideration of the weight of the tubes or cables, and volume, as there must be an appropriate manoeuvring space for displacement thereof.

The presence of the tubes or cables further limits the velocity with which the head can be made to translate along the support arm.

Lastly, the gripping by suction of the object by the gripping element is actually not so instantaneous and immediate from the moment at which the suction source is activated.

The aim of the present invention is therefore to provide a suction gripping device that is able to obviate the above-mentioned drawbacks present in the gripping devices of known type.

In particular, an aim of the invention is to provide a suction gripping device having a modest volume, able to allow rapid displacements of the head along the support arm and an instantaneous grip by suction of the object, that is independent of the position of the head with respect to the arm.

The above-cited aims are obtained by a suction gripping device according to claim 1.

Further characteristics and advantageous aspects of the gripping device of the present invention are set down in the various claims dependent on claim 1.

The characteristics of a preferred, but not exclusive, embodiment of the suction gripping device of the present invention will be described in the following with reference to the appended tables of drawings, in which:

FIG. 1 schematically illustrates a perspective view of the suction gripping device that is the object of the present invention;

FIG. 2 further schematically illustrates a schematic and perspective view, partly-sectioned, of the gripping device of FIG. 1;

FIG. 2A schematically illustrates, in a partly-sectioned perspective view, the part of the gripping device predisposed for suction gripping of objects;

Figure 6:
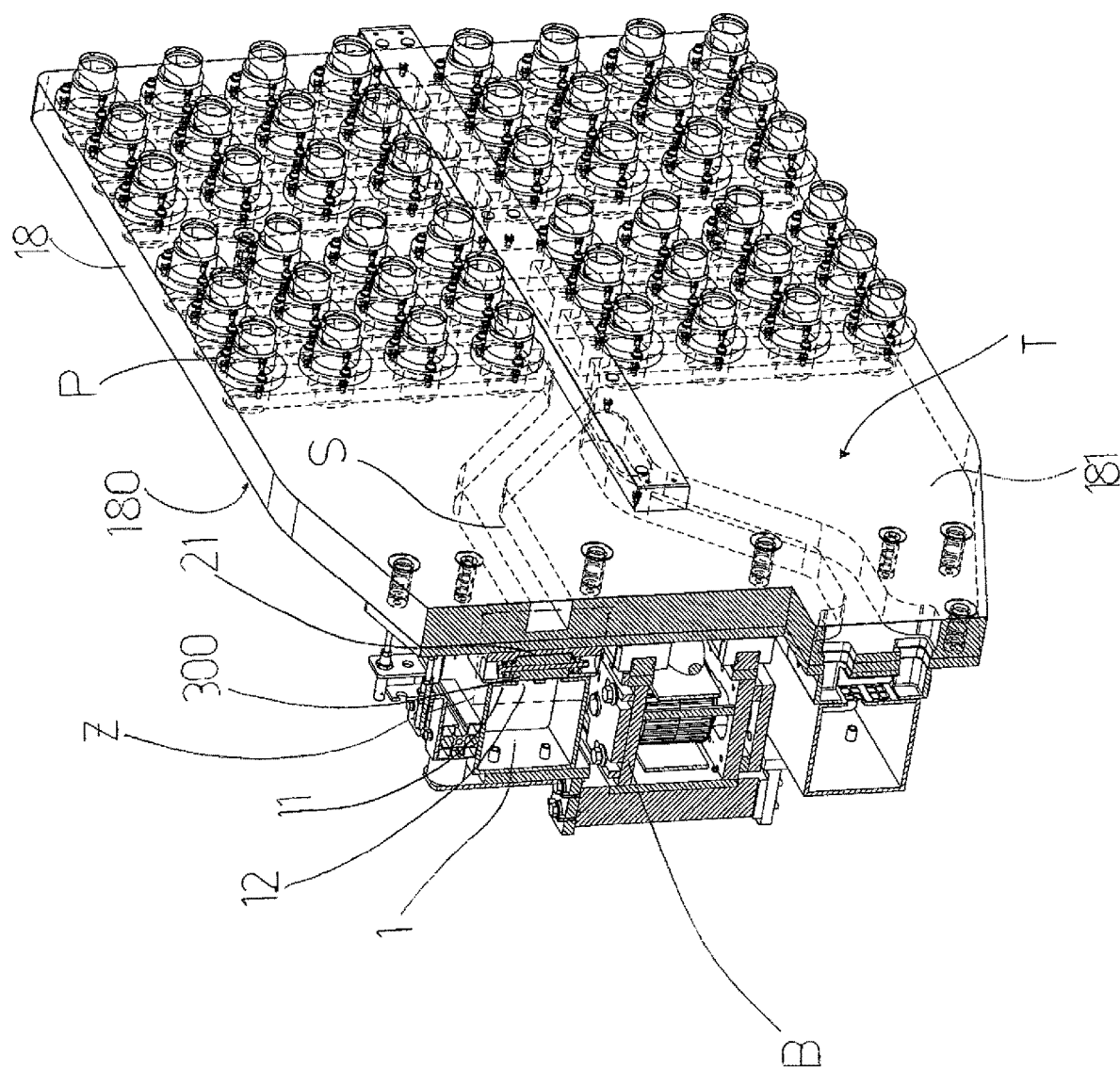
FIG. 6 is a partial view, sectioned according to a transversal section plane, of other significant parts of the gripping device according to the present invention.
Figure 7:
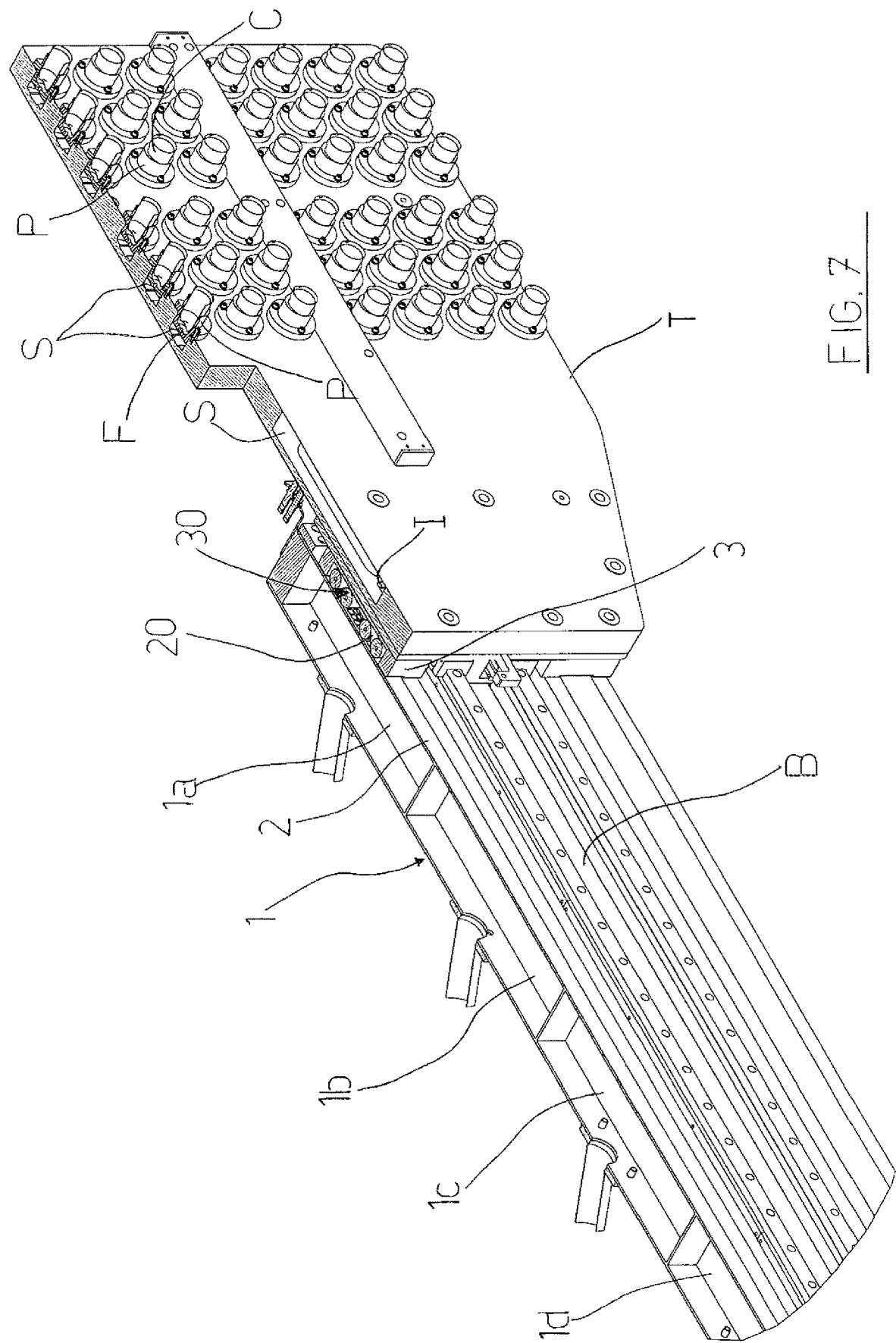
Figure 8B:
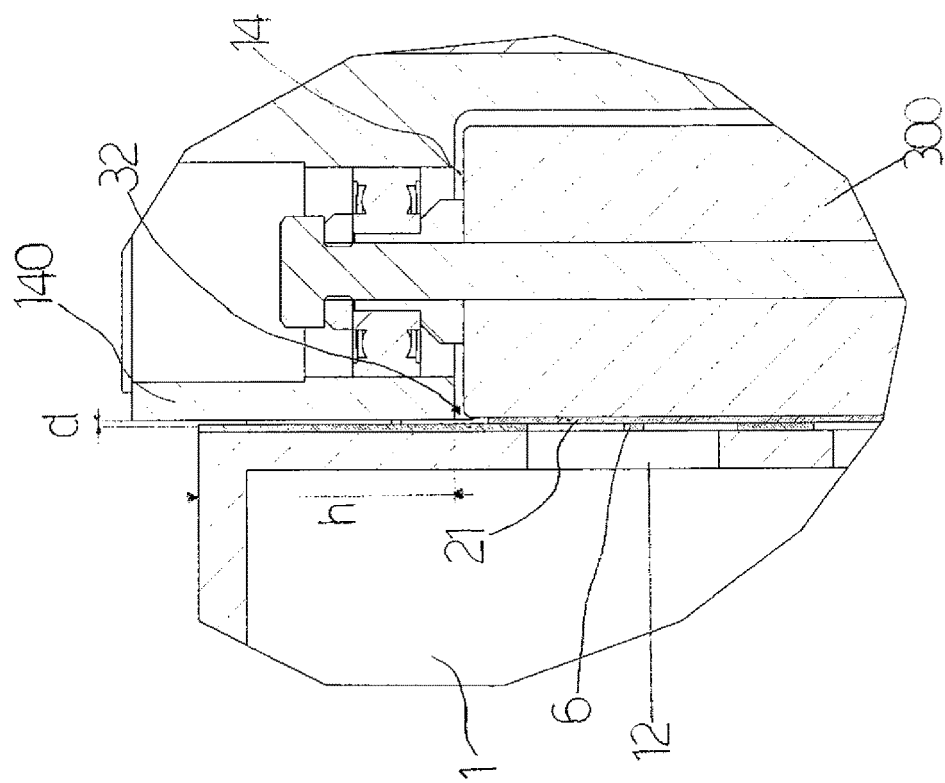
Figure 8A:
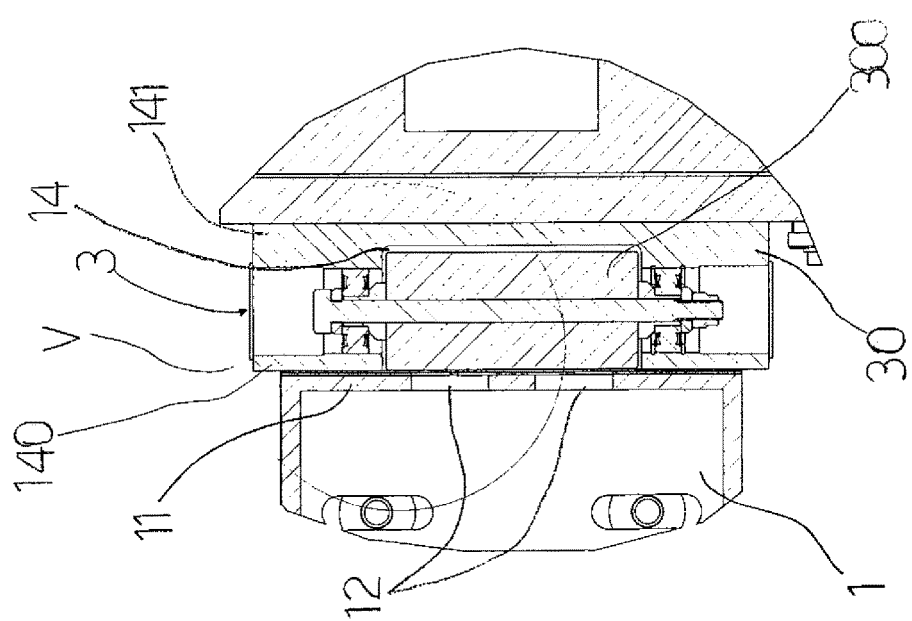
Figure 8C:
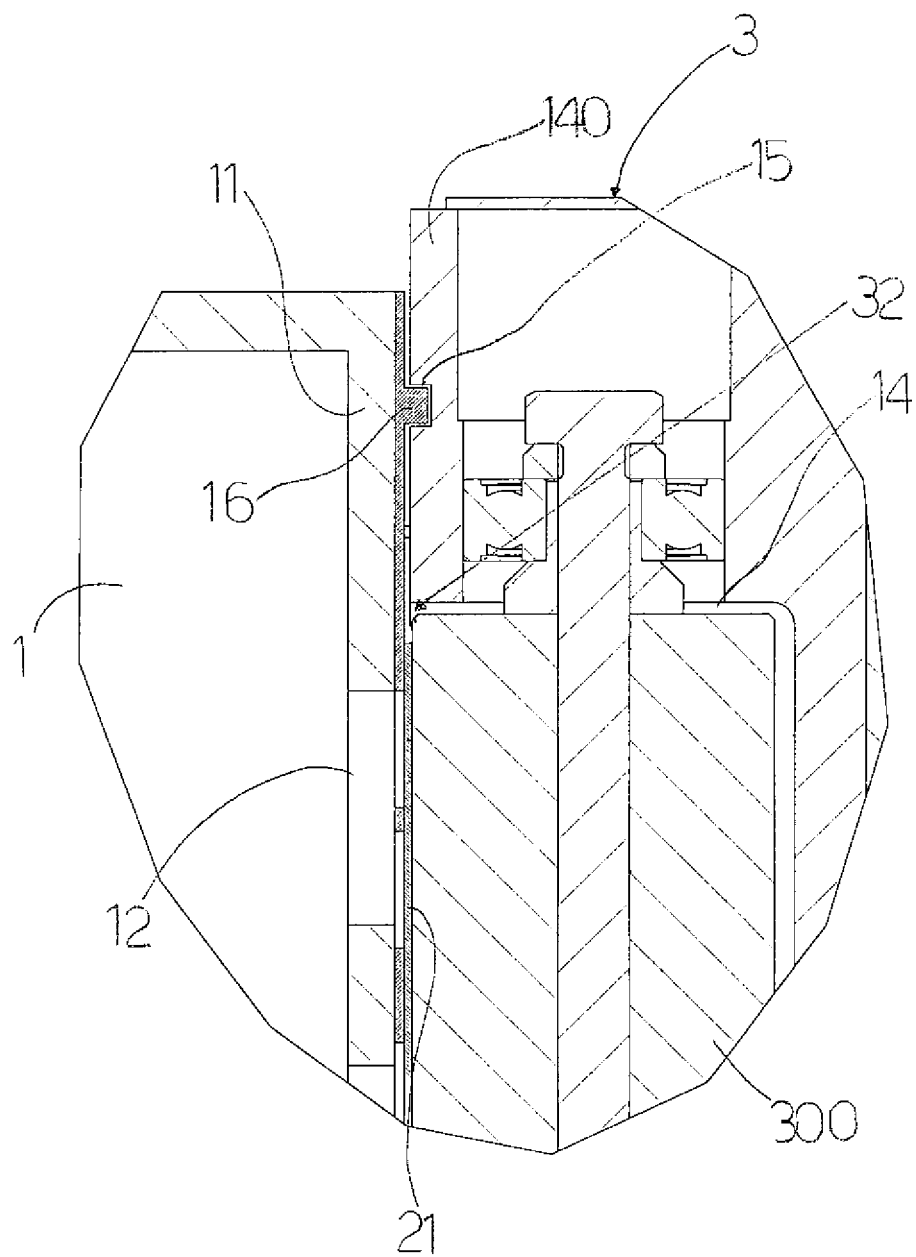

FIG. 7 schematically illustrates a partial perspective view, partly-sectioned, of a possible variant of the gripping device of the invention;

FIG. 8A illustrates detail Z of FIG. 6 in larger scale;

FIG. 8B illustrates detail V of FIG. 8A in larger scale;

FIG. 8C illustrates detail V of FIG. 8A in larger scale according to a possible variant embodiment.

With reference to the drawings, reference (D) denotes the suction gripping device that is the object of the present invention in its entirety.

The gripping device (D) of the invention can advantageously be used in all those cases in which it is necessary to carry out the picking-up of an object from a picking-up position and to transfer it to a release position, where the object can be released or be picked up by special handling organs.

For example, the gripping device (D) of the invention is advantageously applied in moulding plants of components made of a plastic material and in particular for picking up a component from an injection moulding press and transferring it to a station predisposed for carrying out further work steps or packing steps of the work cycle of the plant.

The suction gripping device (D) comprises a support arm (B) and a head (T) comprising at least a suction gripping element (P) and which is mounted on the support arm (B) in such a way as to be translatable alternatively along the support arm (B) in order to displace the suction gripping element (P) at least between a picking-up position of an object and a release position of the object (not illustrated).

Figure 1:
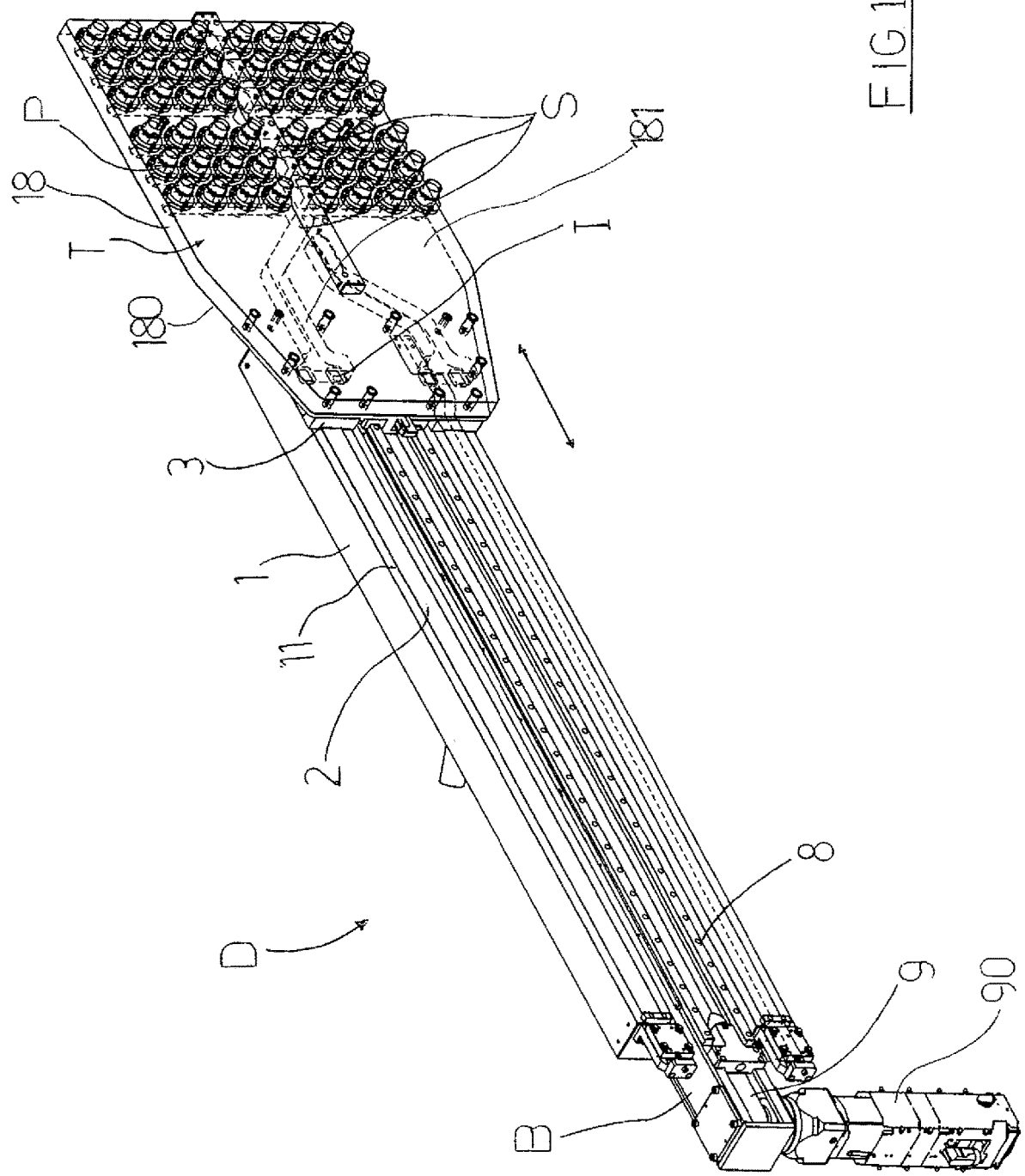
Figure 2:
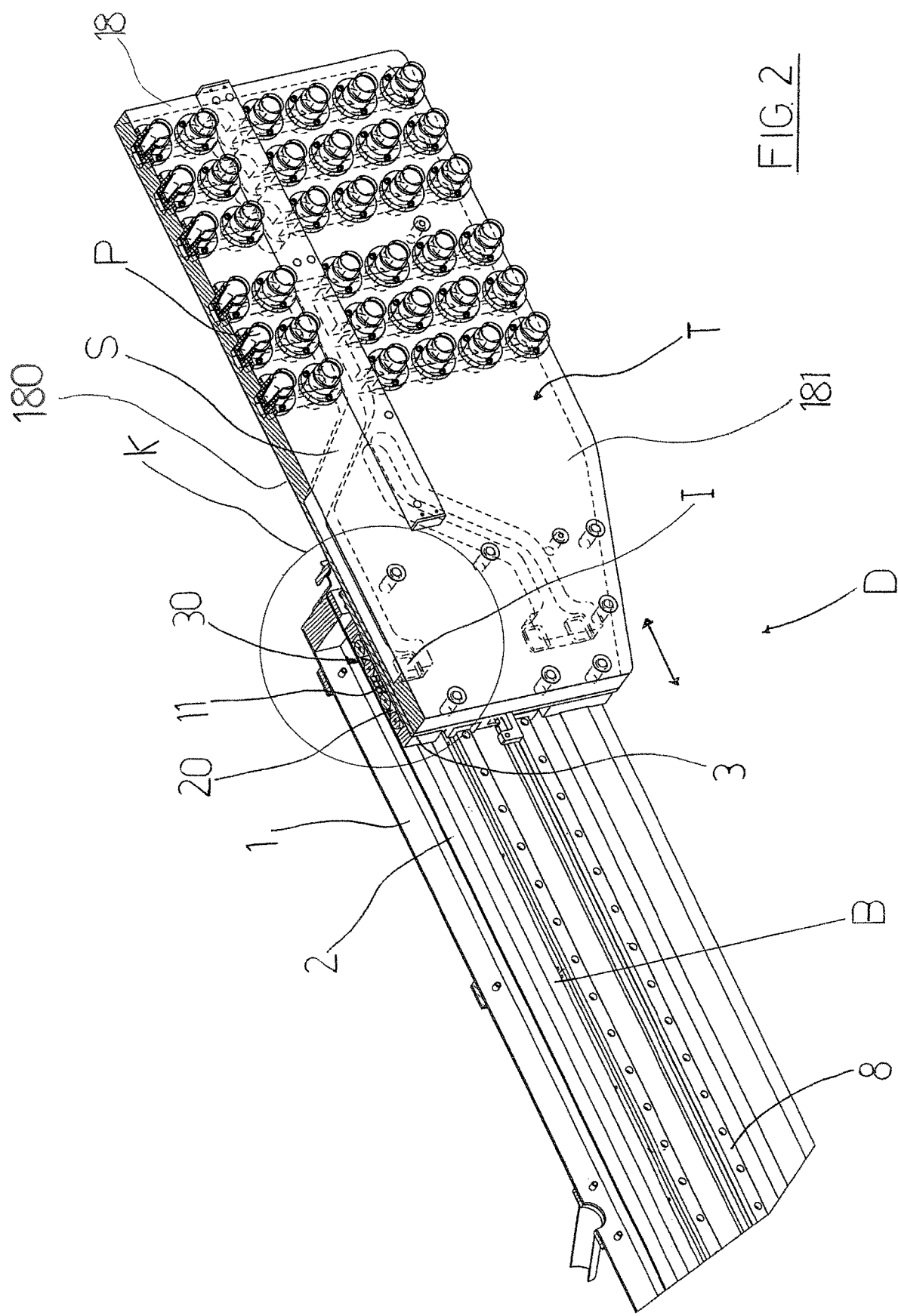

The head (T) also comprises at least an inlet (I) for passage of fluid and, internally thereof, a channelling system (S) for passage of fluid which is predisposed in order to place the inlet (I) and the gripping element (P) in reciprocal communication (see for example FIGS. 1 and 2).

Figure 2A:
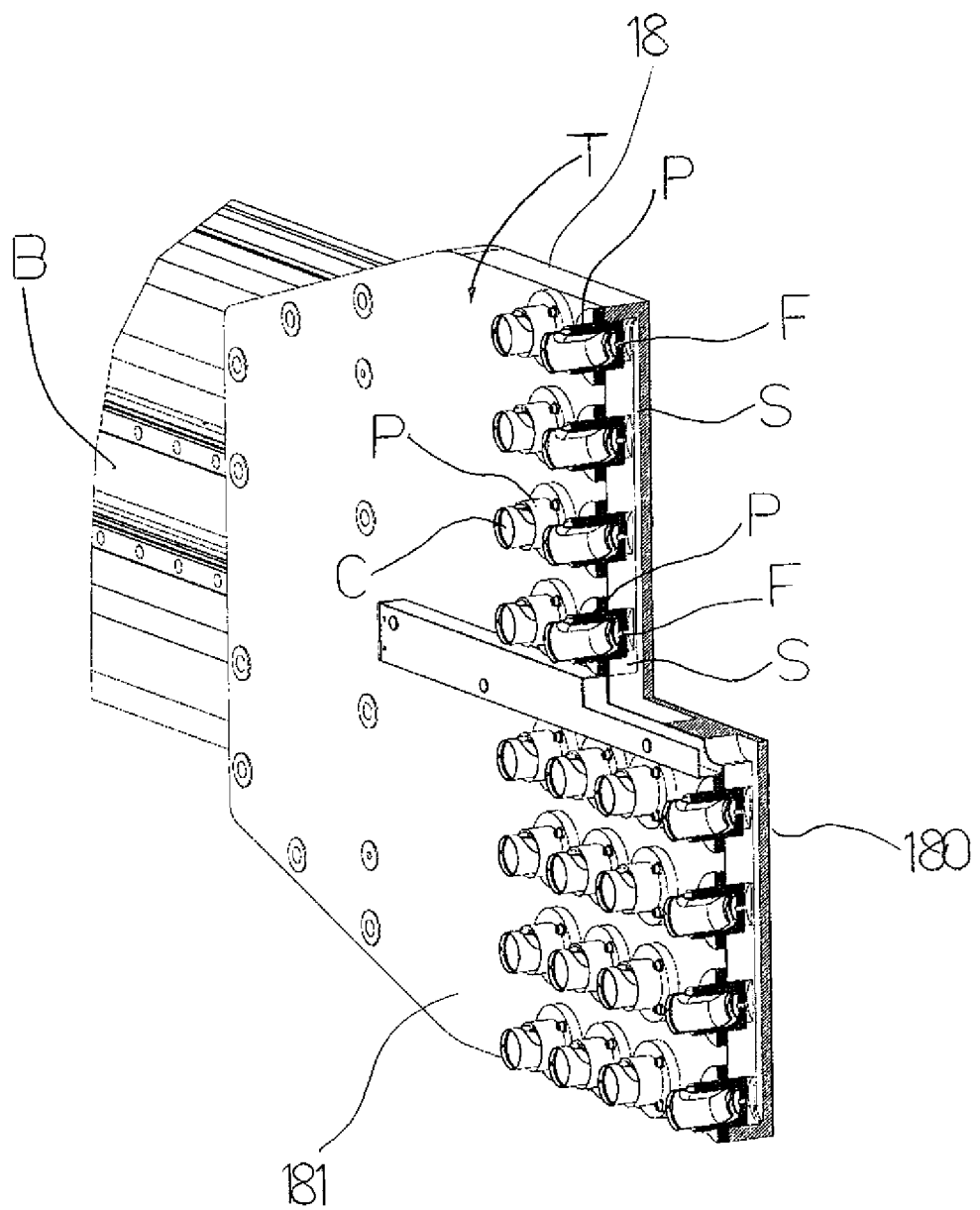

In the preferred but not exclusive embodiment illustrated in the figures, the head (T) comprises a series of gripping elements (P), for example constituted by beakers, each of which is in communication via a hole (F) with the channelling system (S) (see in particular FIG. 2A in which the beaker gripping elements (P) are illustrated, having at the base thereof a hole (F) for communication with the channelling system; in this figure a series of relative objects (C), for example components made of a plastic material, are shown by way of example, and are retained by suction internally of the beakers/gripping elements (P)).

A first special characteristic of the suction gripping device (D) of the present invention consists in the fact that it comprises:

at least a manifold element (1), for example having a substantially longitudinal extension, which is predisposed so as to be arranged parallel to the support arm (B), for example superiorly or inferiorly of the support arm (B), along the extension thereof and to be connected to a suction source (not illustrated) so as to be maintained in depression, the manifold element (1) having a side (11) thereof facing towards the head (T) and structured and configured so as to enable a passage of fluid between the outside and inside of the manifold element (1).

In this regard, the side (11) can comprise, along a portion of length at least equal to the entity of the translation of the head (T) between the picking-up position and the release position, a single passage opening (12) or a series of openings (12) for passage of fluid arranged consecutively to one another.

The gripping device (D) further comprises seal means (2) which are predisposed along the side (11) of the manifold element (1) at the opening (12) or the series of openings (12) so as to prevent the passage of fluid between the outside and the inside of the manifold element (1) and enable maintaining the inside of the manifold element (1) in depression, and therefor in a vacuum.

Figure 4:
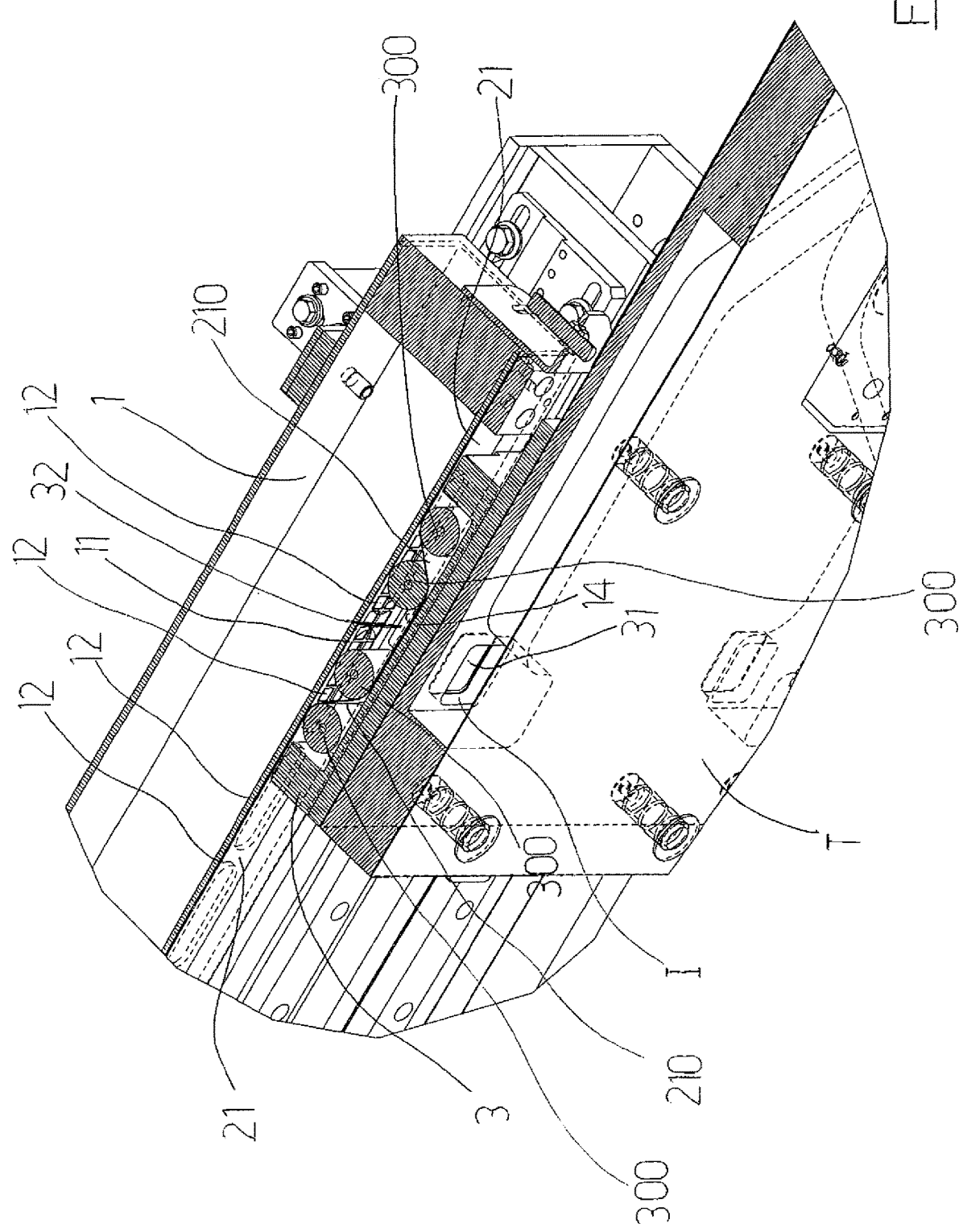
FIG. 4 is a larger-scale illustration of the detail denoted by letter K of FIG. 2 from a different angle.
Figure 5:
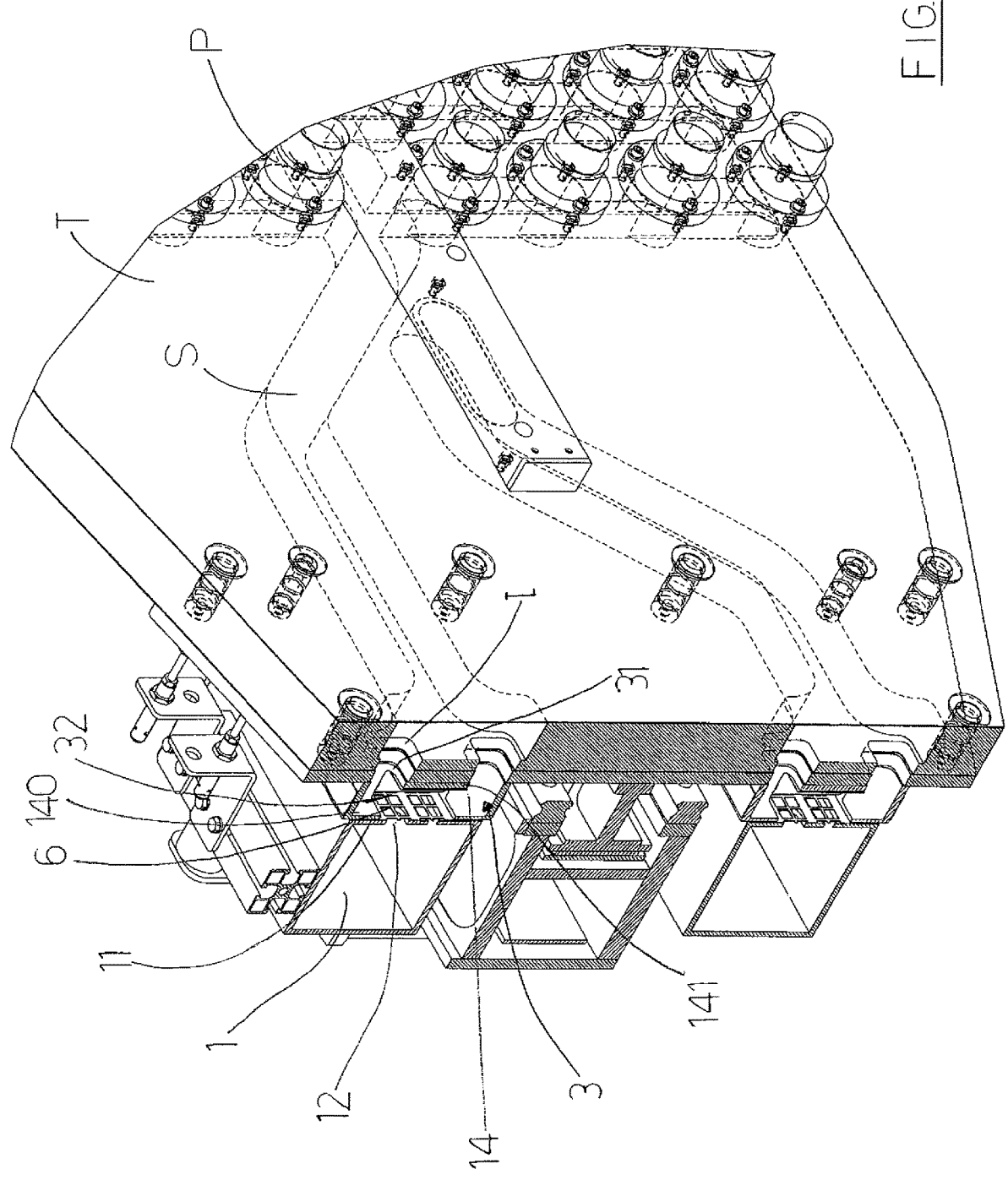
FIG. 5 is a partial view, sectioned according to a transversal section plane, of a significant part of the gripping device according to the present invention.

A first special characteristic of the gripping device (D) of the present invention consists in the fact that it comprises a fluid distributor group (3) comprising a chamber (14), a front wall (140), a rear wall (141), a first window (31) for passage of fluid in the rear wall (141) communicating with the chamber (14) and a second window (32) for passage of fluid in the front wall (140) communicating with the chamber (14), and which is mounted on the head (T) so as to be interposed between the inlet (I) present in the head (T) and the side (11) of the manifold element (1), the first window (31) for passage of fluid being in communication with the inlet (I) and the second window (32) for passage of fluid being at the seal means (20) (see FIGS. 4 and 5).

Figure 3:
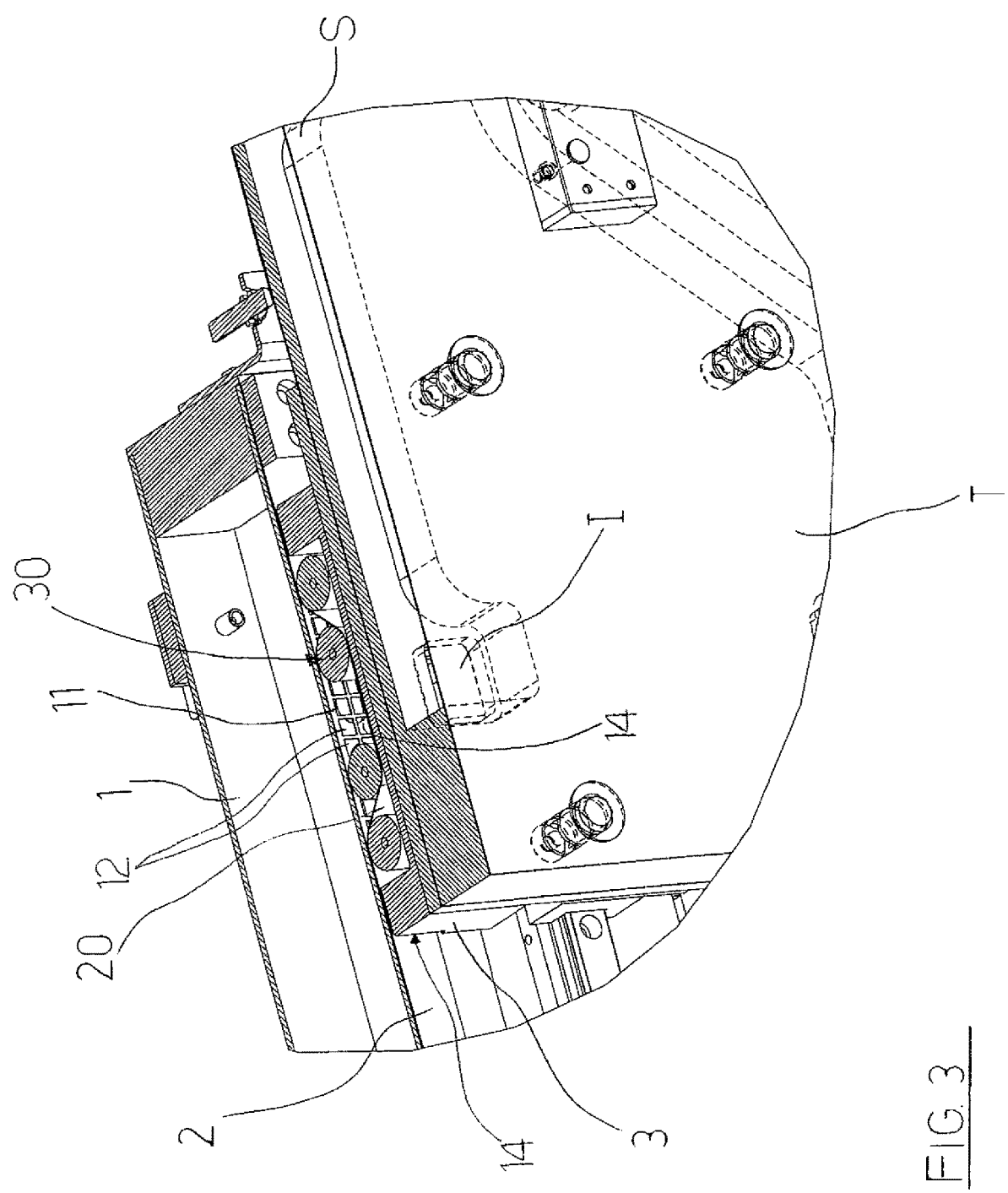
FIG. 3 is a larger-scale illustration of the detail denoted by letter K of FIG. 2.

In particular, in an advantageous aspect of the invention, the distributor group (3) is configured and conformed so that, when it is mounted on the head (T), the front wall (140) is opposite and positioned in proximity of the side (11) of the manifold element (1) so that the distributor group (3) translates along the side (11) without there being contact between the front wall (140) and the side (11) when the head (T) is translated along the support arm (B) (see in detail FIGS. 8A, 8B and 8C). The fluid distributor group (3) (see for example FIGS. 2 and 3), further comprises, internally of the chamber (14), spacer means (30) which are predisposed and configured so as to maintain a portion (20) of the seal means (2) distanced from the side (11) of the manifold element (1) in such a way as to place the inside of the manifold element (1) in fluid communication with the chamber (14), via the second window (32) for passage of fluid, and with the inlet (I), via the first window (31) for passage of fluid, and thus maintain the channelling system (S) in depression (i.e. in a vacuum) for activation in suction of the gripping element (P).

The spacer means (30) being further predisposed in such a way, during the translation of the head (T) along the support arm (B) and the sliding of the distributor group (3) along the side (11) of the manifold element (1), as to distance, and maintain distanced, the portion (20) of the seal means (2), which time by time is at the second window (32) for passage of fluid of the distributor group (3), from the side (11) so as to constantly maintain the inside of the manifold element (1) in fluid-dynamic communication with the chamber (14) and therefore, via the first window (31) for passage of fluid, with the inlet (I), and thus maintain the channelling system (S) in depression (vacuum) for enabling the gripping element (P) to suction-grip an object, and to maintain the suction grip of the object during the translation of the head (T) along the support arm (B), at least between the picking-up position and the release position.

In the gripping device (D) of the invention, the fact of including a manifold element (1) arranged parallel to and along the extension of the support arm (B), which is constantly maintained in depression, i.e. in a vacuum, enables directly and constantly to make available to the head (T) a suction force independently of the position thereof along the support arm (B), without any need to have to move and displace cables or transmission tubes of the suction (the vacuum).

This enables the gripping device (D) to have a modest volume, and less inertia resistance for displacing the head (T), as no other components are present (cables/tubes for transmission of the suction (vacuum) force) which have to be displaced during the translation of the head (T).

Further, thanks to the particular arrangement of the distributor group (3) with respect to the head (T) and the side (11) of the manifold element (1), in particular thanks to the fact that the front wall (140) of the distributor group (3) is arranged opposite and in proximity of the side (11), at a minimum distance (d) therefrom with no reciprocal contact, the head (T) can easily translated, and at very high velocities (beyond 10 m/s) with significant accelerations (100 m/s$^2$), with no dragging along the support arm (B), so as to bring into and position the gripping element (P) in the picking-up position of the object and thus subsequently translate it into the release position, obtaining a significant reduction in the time required for each work cycle of picking up and releasing the object, and therefore an increase in productivity.

For example, the distributor group (3) can be mounted on the head (T) and be dimensioned so that the front wall (140) is arranged at a distance (d) from the side (11) of the manifold element (1) of about 0.3-0.5 mm.

Further, the presence of the distributor group with the spacer means predisposed internally thereof for distancing from the side of the manifold element the portion of the seal means which, time by time, is located at the position of the second window of the distributor group, and therefore of the head, enables constantly maintaining the channelling system present in the head in communication with the inside of the manifold element, and therefore in depression (vacuum), so that the gripping element (P) is constantly active in suction, independently of the position of the head (T) along the support arm (B).

This enables having a substantially instantaneous grip, i.e. with no delay, of the object as soon as the gripping element (P) is brought, by the translation of the head (T) along the support arm, into the picking-up position.

The fact of having two facing surfaces for a significant surface area, at a minimum distance (d) and without mutual contact, for example at a distance (d) of about 0.3-0.5 mm as mentioned in the foregoing, like the side (11) of the manifold element (1) and the front wall (140) of the distributor group (3) (as illustrated in detail and evidenced in FIGS. 8A, 8B and 8C), enables in any case creating a more than effective resistance to the passage of air, and therefore an excellent seal effect, in relation to the velocities and accelerations with which the head is translated along the support arm.

For example, and advantageously, the extension in height (h) of the surfaces of the side (11) and of the front wall (140) opposite one another, can be comprised between 20 and 30 mm.

In fact, for a distance (d) as indicated in the foregoing and for a height value (h) of the surfaces facing one another of the side (11) and the front wall (140), as indicated herein above, it has been observed that any loss of air by leakage through the slim passage existing between the side (11) of the manifold element (1) and the front wall (140) of the distributor group (3) is irrelevant and has no influence on the efficiency of the suction.

Therefore, definitively, the gripping device of the present invention enables, with respect to the known-type devices, obtaining a reduction of volumes, a reduction in inertia for displacements of the head along the support arm, a reduction in the time required for each work cycle of picking-up and releasing the object, and therefore an increase in productivity, and a substantially instantaneous grip on the object as soon as the gripping element reaches the picking-up position.

In a possible variant embodiment illustrated in FIG. 8C, directed at increasing the seal efficiency but in any case with no reciprocal dragging contact between the front wall (140) of the distributor group (3) and the side (11) of the manifold element (1), the front wall (140) can comprise, in a part thereof opposite the side (11), at least a groove (15) while the side (11) in turn comprises, in a relative portion facing the groove (15), a rib (16) which is dimensioned so as to insert in the groove (15) without reciprocal contact.

The number of pairs of grooves/ribs can also be greater than what is illustrated in FIG. 8C.

With this configuration a slim passage for air is created, having a sort of labyrinth shape which enables further reducing air loss by leakage and therefore increases the seal.

The head (T) is mounted on the support arm (B) by sliding guides (8), predisposed on a side of the support arm (B), and is translatable along the sliding guides (8) by means of a belt element or belt (9) loop-wound and activatable by means of an actuator organ (90), for example a brushless motor (see for example FIG. 1).

The manifold element (1) can be predisposed on an appropriate support (not illustrated) or mounted directly on the support arm (B).

In the illustrated embodiment of the figures, the head (T) comprises a plate-shaped support member (18) conformed so as to have a first face (180) and a second face (181) parallel to one another and comprising internally thereof the channelling system (S) for the passage of fluid.

In this case, the inlet (I) is realised on the first face (180) so as to be in communication with the channelling system (S), the fluid distributor group (3) being mounted on the first face (180) at the inlet (I), the beaker-shaped gripping elements (P) being predisposed and mounted on the second face (181) and communicating via relative holes (F) realised in the second face (181) with the channelling system (S).

The plate-shaped support member (18) being translatably mounted on the support arm (B) so that the first face (180) is facing towards the side (11) of the manifold element (1) with the front wall (140) of the fluid distributor member (3) opposite and in proximity of the side (11).

In a further preferred aspect of the gripping device (D) of the invention, the seal means (2) comprise a belt element (21) predisposed adheringly along the side (11) of the manifold element (1) so as to prevent passage of fluid between the outside and the inside of the manifold element (1), in particular the belt element (21) is arranged so as occlude the opening (12) or the series of openings (12) for passage of fluid present on the side (11).

In this case, the spacer means (30) are predisposed internally of the chamber (14) of the fluid distributor group (3) between the first window (31) for passage of fluid and the second window (32) for passage of fluid, and are configured so as to distance, from the side (11) of the manifold element (1), the portion (210) of the belt element (21) which, time-by-time during the translation of the head (T) along the support arm (B), is positioned at the second window (32) of passage of fluid.

In this way the inside of the manifold element (1) is constantly in communication, via the second window (32), with the chamber (14) of the fluid distributor group (3) and therefore also in communication with the channelling system (S) present in the head (T), via the first window (31) for passage of fluid of the fluid distributor group (3) and the inlet (I) of the head (T), so that the channelling system (S) can be constantly maintained in depression (vacuum) for enabling the gripping element (P) to be constantly active in suction (see FIG. 4, for example).

According to the preferred, but not exclusive, embodiment illustrated in the accompanying the figures, the spacer means (30) comprise idle return rollers (300) of the belt element (21).

The idle return rollers (300) are reciprocally arranged with respect to one another internally of the chamber (14) and with respect to the second window (32) for fluid passage and to side (11) of the manifold element (1) in such a way that the portion (210) of the belt element (21), during the translation of the head (T) along the support arm (B) and the sliding of the distributor group (3) along the side (11) of the manifold element (1), is first detached from the side (11) of the manifold element (1), brought internally of the chamber (14) via the second window (32), maintained internally of the chamber (14) and distant from the side (11) and then returned to contact with the side (11) of the manifold element (1) (FIG. 4).

In this regard, the second window (32) for passage of fluid has dimensions that are such (for example a greater height than the width of the belt) as to enable passage of the portion of belt through it.

For example, the idle return rollers (300) can comprise a first pair of rollers, included for deviating and distancing the belt element from the side of the manifold element, and a second pair of rollers included for returning the belt element into contact with the side of the manifold element.

The spacer means (30) can also comprise a different number of rollers arranged differently, or can be constituted by any other equivalent means suitable for distancing the portion (210) of the belt element (21) which time by time is at the position of the second window (32) of the distributor group (3) during the displacement thereof with respect to the side (11) of the manifold element (1) as a consequence of the translation of the head (T) along the support arm (B).

A further advantageous aspect of the gripping device (D) of the invention relates to the fact that it comprises (see for example FIG. 5) anti-deformation elements (6) of the belt element (21) which are predisposed so as to prevent the portions of the belt element (21) not involved in the passage of the fluid distributor group (3) from being partially sucked internally of the manifold element (1).

For example, the anti-deformation elements (6) comprise grid or mesh elements predisposed so as to be positioned at the opening (12) or at the series of openings (12) present in the side (11) of the manifold element (1).

The gripping device (D) can further be provided with sensors (not illustrated in the figures) which are predisposed so as to detect both the position of the head (T) with respect to the support arm (B) and the position of the portion (20) of the seal means (2) which is distanced from the side (11) of the manifold element (1).

This enables real-time and precise data to be collated on the positioning both of the head (T), therefore of the suction gripping element (P), and at which position along the side of the manifold element (1) the communication between the inside of the manifold element (1) and the channelling system (S) internal of the head (T) takes place, so as to be able to intervene by deactivating the suction source and stopping the head should the need arise to interrupt the functioning of the device for safety reasons.

FIG. 7 illustrates a possible advantageous variant of the gripping device of the invention, according to which the manifold element (1) is structured so as to comprise internally thereof a series of sectors (1a, 1b, 1c, 1d) reciprocally separate and predisposed in such a way as to be independently in communication with a suction source, so that it is possible to activate or deactivate the creation of a depression (vacuum) internally thereof independently of one another.

This configuration of the manifold element enables, advantageously, making the gripping and/or release operations of the objects by the gripping elements more rapid.

In fact, it will be sufficient to activate or interrupt the aspirating action (creation/deactivation of the depression or vacuum) only for the single sector which the distributor group (3) has reached during the translation of the head (T) along the support arm (B).

For example, in FIG. 7 the head (T) has been translated along the support arm (B) (towards the right when looking at FIG. 7) up to a gripping position in which the gripping elements (P) must grip relative objects (C) by suction and such that the distributor group (3) is at the sector (1a) of the manifold element (1).

In this situation all the sectors (1a,1b,1c,1d) internally of the manifold element (1) are in communication with the suction source and thus maintained in depression so that the suction grip can take place instantaneously as soon as the gripping elements (P) reach the gripping position for the picking up of the objects.

The head (T) will then be translated along the support arm (B), in the opposite direction with respect to the previous translation (towards the left looking at FIG. 7), so as to bring the objects (C) retained by the gripping elements (P) to the release position.

If, for example, the release position of the objects is in a position corresponding to the position of the sector of the manifold element (1) denoted by reference numeral (1c), it will be sufficient to disable the suction source which is in communication with this sole sector, without intervening on the other sectors, so that there will no longer be a depression (vacuum) in the sector (1c).

In this way, as soon as the translation of the head (T) along the support arm (B) brings the distributor group (3) to this sector (1c), the release of the objects by the gripping elements (P) can take place in an extremely rapid way.

The small dimensions of the volumes of the various sectors, with respect to the case in which the manifold element has a single sector along the extension thereof, in fact, require a very short time both for the creation of a depression and for the resetting of the normal pressure internally of each of them.

In a further preferred embodiment thereof, the gripping device (D) can also comprise a second manifold element arranged specularly to the first manifold element with respect to the support arm, provided with a relative side configured so as allow passage of fluid between the outside and the inside, and second seal means predisposed on the side of the second manifold element for preventing the passage of fluid between the outside and inside and maintain the inside of the second manifold element in depression.

In this case the head will be provided with at least a second gripping element or a second series of gripping elements, of a second inlet and a second channelling system for passage of fluid in order to place the second gripping element (or second series of gripping elements) in communication with the second inlet.

The device will also comprise a second distributor group, borne by the head between the second inlet and the side of the second manifold element, provided with second spacer means for distancing, and maintaining distant, a portion of the second seal means from the side of the second manifold element that, time by time, is at the position of the second distributor group, so as to place the inside of the second manifold element in communication with the second inlet and with the second channelling system, in order to maintain the second channelling system in depression and therefore the second gripping element (second series of gripping elements) active in suction.

The invention claimed is:

1. A suction gripping device comprising:
   a support arm;
   a head comprising at least a suction gripping element, an inlet for fluid passage and a channelling system for passage of fluid predisposed internally of the head so as to place the inlet and the at least a suction gripping element in mutual communication, the head being mounted on the support arm in such a way as to be translatable alternatively along the support arm in order to displace the suction gripping element at least between a picking-up position of an object and a release position of the object;
   at least a manifold element, having a substantially longitudinal extension and being predisposed so as to be arranged parallel to the support arm superiorly or inferiorly thereto, along the extension thereof and so as to be connected to a suction source in order to be maintained in depression, the manifold element having a side thereof facing towards the head and comprising, along a portion of length at least equal to the entity of the translation of the head between the picking-up position and the release position, a single opening for passage of fluid or a series of openings for passage of fluid, each opening of the series of openings being arranged one consecutively after another;

seal means which are predisposed along the side of the manifold element at the opening or the series of openings so as to prevent the passage of fluid between the outside and the inside of the manifold element and enable maintaining the inside of the manifold element in depression;

a fluid distributor group, comprising a chamber, a front wall, a rear wall, a first window for passage of fluid in the rear wall communicating with the chamber and a second window for passage of fluid in the front wall communicating with the chamber, the fluid distributor group being mounted on the head so as to be interposed between the inlet present in the head and the side of the manifold element, the front wall being opposite and in proximity of the side of the manifold element, so that the distributor group translates along the side without there being any contact between the front wall and the side during the translation of the head along the support arm, the first window for passage of fluid being in communication with the inlet and the second window for passage of fluid being located at the seal means, the fluid distributor group further comprising, internally of the chamber, spacer means which are predisposed and configured so as to maintain a portion of the seal means distanced from the side of the manifold element in such a way as to place the inside of the manifold element in fluid-dynamic communication with the chamber via the second window for passage of fluid and therefore with the inlet, via the first window for passage of fluid, and thus maintain the channelling system in depression for activation in suction of the gripping element, the spacer means being further predisposed in such a way, during the translation of the head along the support arm and the sliding of the distributor group along the side of the manifold element, as to distance, and maintain distanced from the side of the manifold element, the portion of the seal means which, during the sliding of the distributor group along the side of the manifold element, is at the second window for passage of fluid of the distributor group, so as to constantly maintain the inside of the manifold element in fluid communication with the chamber and therefore, via the first window for passage of fluid, with the inlet and thus maintain the channelling system in depression for enabling the gripping element to suction-grip an object and to maintain the suction grip of the object during the translation of the head along the support arm, at least between the picking-up position and the release position.

2. The gripping device of claim 1, wherein the seal means comprise a belt element predisposed adheringly along the side of the manifold element so as to prevent the passage of fluid between the outside and the inside of the manifold element.

3. The gripping device of claim 2, wherein the spacer means are predisposed internally of the chamber of the fluid distributor group between the first window for passage of fluid and the second window for passage of fluid, and are configured so as to distance, from the side of the manifold element, the portion of the belt element which, during the translation of the head along the support arm, is at the second window for passage of fluid, so as to place the inside of the manifold element in communication, via the second window, with the chamber of the fluid distributor group and therefore also in communication with the channelling system present in the head, via the first window for passage of fluid of the fluid distributor group and the inlet of the head, so that the channelling system can be constantly maintained in depression for enabling the gripping element to be constantly active in suction.

4. The gripping device of claim 3, that wherein the spacer means comprise idle return rollers of the belt element, the idle return rollers being reciprocally arranged with respect to one another internally of the chamber and with respect to the second window for passage of fluid and to the side of the manifold element in such a way that the portion of the belt element, during the translation of the head along the support arm and the translation of the distributor group along the side of the manifold element, is first detached from the side of the manifold element, brought internally of the chamber via the second window for passage of fluid, maintained internally of the chamber and then returned to contact with the side of the manifold element.

5. The gripping device of claim 2, further comprising anti-deformation elements of the belt element which are predisposed so as to prevent the portions of the belt element not involved in the passage of the fluid distributor group from being partially sucked internally of the manifold element.

6. The gripping device of claim 1, wherein the front wall of the distributor group comprises, in a part thereof opposite the side of the manifold element, at least a groove and in that the side comprises, in a relative portion facing the groove, a rib dimensioned so as to insert in the groove without any reciprocal contact.

7. The gripping device of claim 1, wherein the head comprises a plate-shaped support member conformed so as to have a first face and a second face parallel to one another and comprising internally thereof the channelling system for the passage of fluid, the inlet being realized on the first face of the plate-shaped support member so as to be in communication with the channelling system and with the fluid distributor group being mounted on the first face of the plate-shaped support member at the inlet, and the at least a gripping element being mounted on the second face of the plate-shaped support member and communicating via at least one respective hole realized in the second face of the plate-shaped support member with the channelling system, the plate-shaped support member being translatably mounted on the support arm so that the first face of the plate-shaped support member is facing towards the side of the manifold element with the front wall of the fluid distributor group opposite and in proximity of the side of the manifold element.

8. A suction gripping device comprising:
   a support arm;
   a head comprising at least a suction gripping element, an inlet for fluid passage and a channelling system for passage of fluid predisposed internally of the head so as to place the inlet and the at least a suction gripping element in mutual communication, the head being mounted on the support arm in such a way as to be translatable alternatively along the support arm in order to displace the suction gripping element at least between a picking-up position of an object and a release position of the object;
   at least a manifold element, having a substantially longitudinal extension and being predisposed so as to be arranged parallel to the support arm superiorly or inferiorly thereto, along the extension thereof and so as to be connected to a suction source in order to be maintained in depression, the manifold element having a side thereof facing towards the head and comprising, along a portion of length at least equal to the entity of the translation of the head between the picking-up position and the release position, a single opening for passage of fluid or a series of openings for passage of fluid, each opening of the series of openings being arranged one consecutively after another;

seal means which are predisposed along the side of the manifold element at the opening or the series of openings so as to prevent the passage of fluid between the outside and the inside of the manifold element and enable maintaining the inside of the manifold element in depression;

a fluid distributor group, comprising a chamber, a front wall, a rear wall, a first window for passage of fluid in the rear wall communicating with the chamber and a second window for passage of fluid in the front wall communicating with the chamber, the fluid distributor group being mounted on the head so as to be interposed between the inlet present in the head and the side of the manifold element, the front wall being opposite and in proximity of the side of the manifold element, so that the distributor group translates along the side without there being any contact between the front wall and the side during the translation of the head along the support arm, the first window for passage of fluid being in communication with the inlet and the second window for passage of fluid being located at the seal means, the fluid distributor group further comprising, internally of the chamber, spacer means which are predisposed and configured so as to maintain a portion of the seal means distanced from the side of the manifold element in such a way as to place the inside of the manifold element in fluid-dynamic communication with the chamber via the second window for passage of fluid and therefore with the inlet, via the first window for passage of fluid, and thus maintain the channelling system in depression for activation in suction of the gripping element, the spacer means being further predisposed in such a way, during the translation of the head along the support arm and the sliding of the distributor group along the side of the manifold element, as to distance, and maintain distanced from the side of the manifold element, the portion of the seal means which, during the sliding of the distributor group along the side of the manifold element, is at the second window for passage of fluid of the distributor group, so as to constantly maintain the inside of the manifold element in fluid communication with the chamber and therefore, via the first window for passage of fluid, with the inlet and thus maintain the channelling system in depression for enabling the gripping element to suction-grip an object and to maintain the suction grip of the object during the translation of the head along the support arm, at least between the picking-up position and the release position, the seal means comprising a belt element predisposed adheringly along the side of the manifold element so as to prevent the passage of fluid between the outside and the inside of the manifold element, further comprising anti-deformation elements of the belt element which are predisposed so as to prevent the portions of the belt element not involved in the passage of the fluid distributor group from being partially sucked internally of the manifold element, wherein the anti-deformation elements comprise grid or mesh elements predisposed so as to be positioned at the opening or at the series of openings present in the side of the manifold element.

\* \* \* \* \*